United States Patent Office 3,334,122
Patented Aug. 1, 1967

3,334,122
METHOD OF PREPARING ARYLSILANES
Joseph Cekada, Jr., and Donald R. Weyenberg, Midland, Mich., assignors to Dow Corning Corporation, Midland, Mich., a corporation of Michigan
No Drawing. Filed May 13, 1964, Ser. No. 367,234
16 Claims. (Cl. 260—448.2)

This application is a continuation-in-part of application Ser. No. 274,323, filed on Apr. 19, 1963, now abandoned.

This invention relates to a new method of producing arylsilanes. This invention also relates to a new method of producing disilylbenzenes.

Arylsilanes are employed in the preparation of organic fluids, rubber gums, and resins to obtain improved heat stability, radiation resistance, strength and other desirable properties. Thus, methods of making these valuable silanes are of importance in the organosilicon field.

It is a primary object of this invention to provide a new direct method of synthesizing arylsilanes. Another object is to provide a new method of preparing disilylbenzenes. These and other objects will be apparent from the following description.

This invention relates to a method comprising reacting (1) an organosilicon compound selected from the group consisting of (a) silanes of the formula

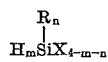

wherein R is selected from the group consisting of alkyl radicals of from 1 to 4 inclusive carbon atoms, aralkyl radicals containing no more than 4 aliphatic carbon atoms and 1 aromatic group, alkaryl radicals containing no more than 4 aliphatic carbon atoms therein, and aryl radicals, X is a halogen atom, $m$ is an integer of from 1 to 3 inclusive, $n$ is an integer of from 1 to 3 inclusive, and the sum of $m+n$ is 2 to 4 inclusive, and (b) siloxanes of the formula

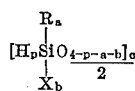

where R and X are as defined above, $a$ has a value of at least 1, the sum of $p$, $a$, and $b$ is greater than 1, but no more than 3, there being an average of at least one silicon-bonded hydrogen atom per molecule, and $c$ has a value of at least 2; with (2) a compound of the formula

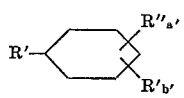

wherein each R′ is selected from the group consisting of aralkyl radicals containing no more than 4 aliphatic carbon atoms and tertiary alkyl radicals of no more than 10 carbon atoms, R″ is selected from the group consisting of alkaryl radicals containing no more than 4 aliphatic carbon atoms, alkyl radicals of no more than 2 carbon atoms, and aryl radicals, and $a'$ and $b'$ are each integers of from 0 to 3 inclusive such that $a'+b'$ is from 0 to 3 inclusive at a temperature sufficient to cause cleavage of aromatic compound (2) so that at least one hydrogen atom in (1) is replaced by an aromatic radical from (2) with the formation of R′H.

The reaction proceeds by way of the reactions

and
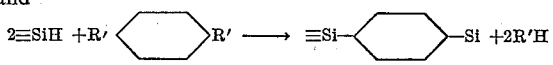

This represents a new reaction for the preparation of aryl silanes and siloxanes.

Organosilicon compound (1) can be a silane or a siloxane as defined above. Silanes that can be employed include $HSiRX_2$, $HSiR_2X$, $HSiR_3$, $H_3SiR$, $H_2SiRX$ or $H_2SiR_2$, wherein R and X are as already defined. While products from reactants above containing one or more X radicals may be prized as more valuable commercially because of their utility as precursors for siloxanes, any of the above reactants can be employed in the process of this invention.

In silane (a) substituent X is a halogen atom. Preferably, X is chlorine, as these compounds are the most readily available, and in this instance there is no advantage to having other halogen atoms present. However, substituent X can be any of the four halogen atoms, if desired.

Radical R in silane (a) and in siloxane (b) can be any radical as above defined. Thus, radical R can be alkyl such as methyl, ethyl, propyl and butyl; aralkyl as defined above such as benzyl, cuminyl or phenethyl; alkaryl such as tolyl, xylyl, duryl, cumyl and thymyl; or aryl such as phenyl, xenyl, naphthyl, anthracyl, fluorenyl and pyrenyl. Any of the above said radicals can be present in component (1). Preferred radicals because of their ready commercial availability are methyl, ethyl, phenyl, tolyl, and xenyl. Most preferred are methyl and phenyl.

When more than one R radical is present in silane (a) or siloxane (b), they can be the same or different. The same is true of X substituents, although normally these latter are alike. Silane (a) can be a single species or a mixture of two or more species; siloxane (b) can be a single species or a mixture of two or more species; and organosilicon compound (1) can be either a silane or mixture of silanes, a siloxane or mixture of siloxanes, or a mixture of silanes and siloxanes each as defined above.

Examples of silanes that can be employed herein include dimethylchlorosilane, methyldibromosilane, methylbenzylfluorosilane, triphenylsilane, methylsilane, propylchlorosilane and phenylmethylsilane.

Examples of siloxanes that can be employed are $HR_2SiOSiR_2HH$, $XRSiOSiRXH$, $HR_2SiOSiR_3$, $H_2RSiOSiR_3$ $H_2RSiOSiR_2H$, $H_2RSiOSiRH_2$, 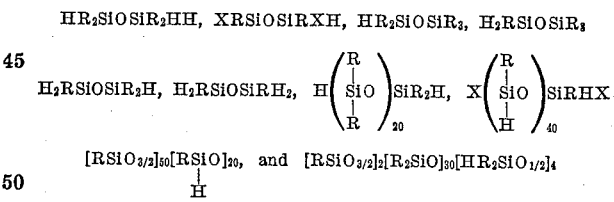

$[RSiO_{3/2}]_{50}[RSiO]_{20}$, and $[RSiO_{3/2}]_2[R_2SiO]_{30}[HR_2SiO_{1/2}]_4$ where R is any of the radicals mentioned above. Methods of making such siloxanes are obvious to those skilled in the art.

Many suitable siloxanes can be prepared by partial or full hydrolysis of the halogen groups of appropriate halogenated silanes, followed by a condensation of the resulting silanol groups. One must be careful to use sufficiently gentle reaction conditions to prevent the complete hydrolysis of the SiH bonds of the silanes. Suitable silanes include $HSiR_2X$, $H_2SiRX$, and $HSiRX_2$, which can optionally be copolymerized with silanes such as $R_3SiX$, $R_2SiX_2$, or $RSiX_3$.

While any of the above siloxanes can be employed, it as benzyl, phenethyl, benzhydryl, cuminyl, trityl, alpha-scribed, since at temperatures normally employed for the reaction of this invention the siloxanes are not as stable and the yields are lower than when silanes are used. However, any one or more said siloxanes and/or silanes can be employed as component (1) in the process of this invention.

Compound (2) can be any compound as depicted above.

Radical R′ can be aralkyl radical as above defined such as benzyl, phenethyl, benzhydryl, cuminyl, trityl, alpha-mesityl, $CH_3C_6H_4CH_2$— and $C_6H_5C(CH_3)_2$—. R′ can also be any tertiary alkyl radical of no more than 10 carbon atoms such as tertiary butyl, 1,1-dimethylhexyl, 1,1-diethylhexyl and 1,1-propylmethylbutyl. Preferred R′ radicals include benzyl, benzhydryl, trityl, and tertiary butyl.

Radical R″ can be aryl such as phenyl, naphthyl and xenyl; or it can be alkaryl such as tolyl, xylyl and cumyl. In addition, R″ and the benzene nucleus of compound (2) can be fused (more than one carbon atom common to two benzoid rings) so that the radical represented by R″$C_6H_4$— in the formula above can be, for example, a naphthyl radical.

As shown above, there is at least one R′ radical in compound (2). In addition, there can be present up to two additional R′ groups, or, in their place, there can be R″ groups. Thus, configurations of compound (2) include $C_6H_5R′$, $C_6H_4R′_2$, $C_6H_3R′_3$, $C_6H_4R′R″$, $C_6H_3R′_2R″$, $C_6H_2R′_2R″_2$, $C_6H_2R′R″_3$ and $C_6H_3R′R″_2$. In addition, configurations wherein R″ is fused to the benzene nucleus, as above described, are also possible. Illustrative of compounds that operate as compound (2) therefore include such as $C_6H_5CH_2CH_2C_6H_5$, $C_3H_7(CH_3)C_6H_3CH_2C_6H_5$, $(C_6H_5)_2C_6H_3CH(C_6H_5)_2$ $C_6H_5CH_2C_6H_4CH_2C_6H_5$, $(CH_3)_3CC_6H_4CH_2C_6H_5$ $C_3H_7C_6H_4C(CH_3)_2C_6H_5$ $C_6H_5C(CH_3)_2C_6H_5$, $(CH_3)_3C_6H_2CH_2C_6H_5$, $(C_6H_5)_4C$, $(C_6H_5)C(CH_3)_3$, and $(C_6H_4)[C(CH_3)_3]_2$.

The reaction proceeds at elevated temperatures. While any elevated temperature produces some reaction, it has been found that a temperature of at least 350° C. is preferred to provide significant reaction in a reasonable time. Above 350° C., increased temperature imparts an increased rate of reaction. It is inadvisable to operate at temperatures above about 650° C. unless an extremely short contact time is used, because above this temperature considerable decomposition of the reactants and any products occurs, so that the major product may be a tarry residue. The best results are obtained at temperatures of 400° C. to 550° C. inclusive. At these temperatures very favorable reaction rates combined with very small amounts of decomposition are the rule. The optimum temperature will, of course, vary in the operative range depending on the stability of the reactants and the reaction rate of the system.

Because at normal operating temperatures virtually all of the reactants are vapors at atmospheric pressure, it is preferable to carry out the reaction in pressure equipment in order to obtain sufficient contact between the two reactants. Some reaction occurs with the more reactive reagents, such as $(C_6H_5)_2CH_2$, when the reaction is carried out at or near atmospheric pressure, but the yield of the desired arylsilane is greatly enhanced when the reaction is conducted under pressure. Autogenous pressures provide good to excellent yields of product. The usual equipment is a sealed reactor such as a sealed Pyrex glass or Vycor glass tube, autoclave, steel or stainless steel bomb or other suitable pressure vessel. Other equipment, for example, equipment that is impervious to reaction with a halosilane, can be used if desired.

The reaction proceeds spontaneously at elevated temperatures. The reactants can be allowed to react for as little or as long a time as desired. Generally, the reaction is complete or substantially complete in about 1 hour at 500° C., but may take a longer or shorter time depending on the reactants and the temperature.

In a particular modification of the method of this invention there can be prepared disilylbenzenes, wherein there are attached to the same benzene nucleus two silyl groups. In this method, silanes (1)(a) described above are reacted with compounds of the formula R′$C_6H_4$R′ wherein R′ is as previously described. The two R′ groups can be located ortho, meta or para on the benzene nucleus, and can be the same or different. Preferably, both R′ radicals are the same. In the reaction, two silyl radicals become attached to the benzene nucleus. The preferred disilylbenzene product is the para-isomer. In addition to the disilylbenzene adduct, monosilylaryl compounds are also formed. When the disilylbenzene is the desired product, preferred R′ radicals are benzyl, benzhydryl and tertiary butyl.

Trisilylbenzenes can also be made in an analogous manner.

This method of this invention is useful for introducing aryl radicals into organosilicon compounds. This method also provides a means of producing disilylbenzenes.

The following examples are illustrative only and should not be construed as limiting the invention which is properly delineated in the appended claims.

*Example 1*

A mixture of 0.472 g. (0.005 mol) of distilled $(CH_3)_2HSiCl$ and 0.84 g. (0.005 mol) of diphenylmethane was sealed in a small Vycor tube so that the free volume was about twice the liquid volume. The sealed tube was heated for 30 minutes in a combustion furnace controlled at 550° C. The cooled sample was then analyzed by gas-liquid chromatographic (GLC), nuclear magnetic resonance (NMR) and infrared (IR) analytical methods. The yield of $C_6H_5(CH_3)_2SiCl$ was 77 percent by GLC analysis and 59.5 percent by NMR analysis.

*Example 2*

In a manner similar to Example 1, 0.945 g. (0.01 mol) of $(CH_3)_2HSiCl$ and 1.29 g. (0.005 mol) of

were heated in a sealed Vycor tube for 30 minutes at 500° C. Analysis by GLC indicated a yield of about 20 percent of

*Example 3*

In like manner to Example 1, 0.005 mol quantities of aryl compounds shown below were heated for the times and temperatures indicated with 0.005 mol of $(CH_3)_2HSiCl$ in sealed Vycor tubes. Yields were determined by GLC and NMR analysis.

| Phenyl Compound | Temp., ° C. | Time-Hour | $C_6H_5(CH_3)_2SiCl$ Percent Yield |
| --- | --- | --- | --- |
| 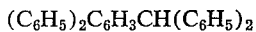 | 500 | 0.5 | 21 |
| $C_6H_5CH_2C_6H_5$ | 500 | 0.5 | 58 |
|  | 500 | 1.0 | 85 |
|  | 550 | 0.5 | 64 |
| $C_6H_5CH(C_6H_5)_2$ | 500 | 0.5 | 51 |
|  | 500 | 1.0 | 72 |
| $C_6H_5CH_2CH_2C_6H_5$ | 500 | 0.5 | 41 |

In the reactions above there was little or no fragmentation or by-product formation even for the run at 550° C. This means that the unreacted materials can be recovered and recycled if desired, so that the yields can be further increased.

*Example 4*

A 1.4 liter stainless steel bomb was loaded with 24.1 g. (0.255 mol) of $(CH_3)_2HSiCl$ and 43.0 g. (0.255 mol) of $(C_6H_5)_2CH_2$. The assembly was heated to 500° C., which required 98 minutes, and held at that temperature for 23 minutes. At the end of this time the indicated pressure was 300 pounds per square inch. The bomb was cooled and dumped. A GLC analysis indicated a 55 percent conversion. Distillation yielded 20.5 g. (0.120 mol) of phenyldimethylchlorosilane, for a distilled yield of 47 percent. Less than 4 percent of the bomb contents were high boiling residue.

Example 5

When any of the silanes shown below are substituted for the $(CH_3)_2HSiCl$ of Example 1, arylsilanes as shown are formed.

| Silane | Arylsilane |
|---|---|
| $H_3SiCH_3$ | $(C_6H_5)_3SiCH_3$ |
| $C_4H_9(H)SiCl_2$ | $C_4H_9(C_6H_5)SiCl_2$ |
| $CH_3(CH_3C_6H_4)(H)SiBr$ | $CH_3(CH_3C_6H_4)(C_6H_5)SiBr$ |
| $(C_6H_5)_2SiH_2$ | $(C_6H_5)_3SiH$ |
| $C_6H_5C_6H_4(CH_3)_2SiH$ | $C_6H_5C_6H_4(CH_3)_2SiC_6H_5$ |
| $C_6H_5CH_2(H)_2SiF$ | $C_6H_5CH_2(C_6H_5)(H)SiF$ and $C_6H_5CH_2(C_6H_5)_2SiF$ |

Example 6

When any of the aryl compounds shown below are reacted with $(CH_3)_2HSiCl$ as in Example 1, arylsilanes as shown are formed.

| Aryl Compound | Arylsilane |
|---|---|
| $CH_3C_6H_4CH_2C_6H_5$ | $CH_3C_6H_4(CH_3)_2SiCl + (C_6H_5)(CH_3)_2SiCl$ |
| $[(CH_3)_2C_6H_3]_2C_6H_3CH_2C_6H_5$ | $[(CH_3)_2C_6H_3]_2C_6H_3(CH_3)_2SiCl + (C_6H_5)(CH_3)_2SiCl$ |
| $(CH_3)_2C_6H_3CH_2C_6H_5$ | $(CH_3)_2C_6H_3(CH_3)_2SiCl + (C_6H_5)(CH_3)_2SiCl$ |
| naphthyl–$CH_2C_6H_5$ / naphthyl–$CH_3$ | naphthyl–$Si(CH_3)_2Cl$ / naphthyl–$CH_3 + (C_6H_5)(CH_3)_2SiCl$ |
| $C_3H_7C_6H_4C_6H_4CH_2C_6H_5$ | $C_3H_7C_6H_4C_6H_4Si(CH_3)_2Cl + (C_6H_5)(CH_3)_2SiCl$ |
| $(C_6H_5)_4C$ | $C_6H_5(CH_3)_2SiCl$ |
| $(CH_3)_3C$–biphenyl | $(CH_3)_2Si(Cl)$–biphenyl |
| pentamethyl diphenylmethane ($CH_3$/$CH_3$/$CH_3$/$CH_3$–$CH_2$–) | tetramethyl phenyl–$Si(CH_3)_2Cl$ |
| $CH_2$-bridged (with $CH_3$, $CH_3$, $C_2H_5$) | $Si(CH_3)_2Cl + CH_3$– ring –$Si(CH_3)_2Cl$ (with $C_2H_5$) |

Example 7

A mixture of 0.67 g. (0.01 mol of silicon-bonded hydrogen) of tetramethyldisiloxane and 1.68 g. (0.01 mol) of diphenylmethane were sealed in a Vycor tube as in Example 1 and heated for 30 minutes at 500° C. Instrumental analysis of the cooled material revealed a 10 percent yield of diphenyltetramethyldisiloxane.

Example 8

When the following siloxanes are reacted with phenyltripropylmethane at 300° C. the following products result:

| Siloxane | Product |
|---|---|
| $H_2SiOSi(CH_3)_3$ with $CH_3$ | $(C_6H_5)_2SiOSi(CH_3)_3 + (C_6H_5)HSiOSi(CH_3)_3$ with $CH_3$ and $CH_3$ |
| $Cl(SiO)_5SiCl$ with $CH_3$, $CH_3$, $H$, $H$ | $Cl(SiO)_5$–$SiCl + Cl(SiO)_5$–$SiCl$ (phenyl substituted) |

Example 9

Into a 6 mm. Vycor brand glass tube was placed one part dimethylchlorosilane and one part of p-benzyltoluene. The tube was heated at 500° C. for 30 minutes.

Analysis of the product showed that 31.6 percent of the theoretical yield of aryl silanes had been formed. 45 percent of this yield consisted of phenyldimethylchlorosilane, while 55 percent of the yield consisted of tolyldimethylchlorosilane.

Example 10

Two equimolar mixtures of dimethylchlorosilane and tertiarybutylbenzene were heated in sealed Vycor glass tubes. Mixture (a) was heated at 500° C. for ½ hour, and mixture (b) was heated at 400° C. for 16 hours.

Both mixtures (a) and (b) yielded about 25% of the theoretical yield of phenyldimethylchlorosilane.

Example 11

A six gallon stainless steel coil was heated to 475° C. and pressurized to 800 p.s.i. A mixture containing 33⅓ mol percent of p-ditertiarybutylbenzene and 66⅔ mol percent of dimethylchlorosilane was fed into the coil at a rate of 150 oz. per hour.

A 32.5% theoretical yield of

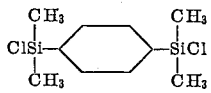

was obtained in a continuous reaction process.

That which is claimed is:
1. A method comprising reacting
   (1) an organosilicon compound selected from the group consisting of
      (a) silanes of the formula

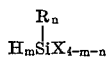

wherein R is selected from the group consisting of alkyl radicals of from 1 to 4 inclusive carbon atoms, aralkyl radicals containing no more than 4 aliphatic carbon atoms and containing no more than 1 aromatic group, alkaryl radicals containing no more than 4 aliphatic carbon atoms therein, and aryl radicals, X is a halogen atom, $m$ is an integer of from 1 to 3 inclusive, $n$ is an integer of from 1 to 3 inclusive, and the sum of $m+n$ is 2 to 4 inclusive, and (b) siloxanes of the formula

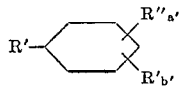

where R and X are as defined above, $a$ has a value of at least 1, the sum of $p$, $a$ and $b$ is greater than 1, but no more than 3, there being an average of at least one silicon-bonded hydrogen atom per molecule, and $c$ has a value of at least 2; with (2) a compound of the formula

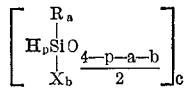

wherein each R' is selected from the group consisting of aralkyl radicals containing no more than 4 aliphatic carbon atoms and tertiary alkyl radicals of no more than 10 carbon atoms, R'' is selected from the group consisting of alkaryl radicals containing no more than 4 aliphatic carbon atoms, alkyl radicals of no more than 2 carbon atoms, and aryl radicals, and $a'$ and $b'$ are each integers of from 0 to 3 inclusive such that $a'+b'$ is from 0 to 3 inclusive at a temperature sufficient to cause cleavage of aromatic compound (2) so that at least one silicon-bonded hydrogen atom in (1) is replaced by an aromatic radical from (2) with the formation of R'H.

2. The method of claim 1 wherein the reaction is conducted at a temperature of at least 350° C.

3. The method of claim 1 wherein organosilicon compound (1) is a silane of (a).

4. The method according to claim 1 wherein X is chlorine.

5. The method according to claim 1 wherein R is methyl.

6. The method according to claim 1 wherein R is phenyl.

7. The method according to claim 1 wherein compound (2) is $C_6H_5R'$.

8. The method according to claim 1 wherein R' is benzyl.

9. The method according to claim 1 wherein R' is tertiary butyl.

10. A method whereby (1) a silane of the formula

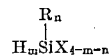

wherein R is selected from the group consisting of alkyl radicals of from 1 to 4 inclusive carbon atoms, aralkyl radicals containing no more than 4 aliphatic carbon atoms therein, alkaryl radicals containing no more than 4 aliphatic carbon atoms therein, and aryl radicals, X is a halogen atom, $m$ is an integer from 1 to 2 inclusive, $n$ is an integer of from 1 to 3 inclusive, and the sum of $m+n$ is from 2 to 4 inclusive is reacted with (2) a compound of the formula $R'C_6H_4R'$ wherein each R' is selected from the group consisting of aralkyl radicals containing no more than 4 aliphatic carbon atoms and tertiary alkyl radicals of no more than 10 carbon atoms at a temperature of at least 350° C. to form (3) a disilylbenzene with the formation of R'H.

11. The method according to claim 10 wherein X is chlorine.

12. The method according to claim 10 wherein compound (2) is the para-isomer and compound (3) is a paradisilylbenzene.

13. The method according to claim 10 wherein R' is benzyl.

14. The method according to claim 10 where R' is tertiary butyl.

15. The method according to claim 10 wherein compound (1) is dimethylchlorosilane, and (2) is p-ditertiarybutyl benzene.

16. The method according to claim 1 where compound (1) is dimethylchlorosilane and (2) is p-ditertiarybutyl benzene.

References Cited
UNITED STATES PATENTS

| | | | |
|---|---|---|---|
| 2,379,821 | 7/1945 | Miller et al. | 260—448.2 |
| 2,546,330 | 3/1951 | Barry et al. | 260—448.2 |
| 2,572,302 | 10/1951 | Barry | 260—448.2 |
| 2,600,198 | 6/1952 | Brewer | 260—448.2 |
| 2,710,875 | 6/1955 | Daudt | 260—448.2 |
| 2,776,326 | 1/1957 | Schneider | 260—672 |
| 2,788,357 | 4/1957 | Barry | 260—448.2 |
| 3,188,359 | 6/1965 | Lenysert et al. | 260—672 |

OTHER REFERENCES

Silsby et al., Journal of Applied Chemistry, vol. 6, August 1956, pp. 347–356.

TOBIAS E. LEVOW, *Primary Examiner.*

H. M. McCARTHY, *Examiner.*

P. F. SHAVER, *Assistant Examiner.*